US009135467B2

(12) United States Patent  
Mishra

(10) Patent No.: US 9,135,467 B2  
(45) Date of Patent: Sep. 15, 2015

(54) FRAUD PREVENTION IN ONLINE SYSTEMS

(71) Applicant: Offerpop Corporation, New York, NY (US)

(72) Inventor: Prakash Mishra, Stamford, CT (US)

(73) Assignee: Offerpop Corporation, New York, NY (US)

(\*) Notice: Subject to any disclaimer, the term of this patent is extended or adjusted under 35 U.S.C. 154(b) by 61 days.

(21) Appl. No.: 13/901,780

(22) Filed: May 24, 2013

(65) Prior Publication Data

US 2013/0318631 A1 Nov. 28, 2013

Related U.S. Application Data

(60) Provisional application No. 61/651,443, filed on May 24, 2012.

(51) Int. Cl.  
*H04L 29/06* (2006.01)  
*G06F 21/62* (2013.01)

(52) U.S. Cl.  
CPC .......... *G06F 21/6245* (2013.01); *H04L 63/102* (2013.01)

(58) Field of Classification Search  
CPC ..................... G06F 21/6245; H04L 63/102  
USPC ............................................................ 726/28  
See application file for complete search history.

(56) References Cited

U.S. PATENT DOCUMENTS

| 5,159,630 | A  | * | 10/1992 | Tseng et al. | 380/243 |
|---|---|---|---|---|---|
| 5,412,729 | A  | * | 5/1995 | Liu | 380/37 |
| 5,539,827 | A  | * | 7/1996 | Liu | 380/37 |
| 6,408,336 | B1 | * | 6/2002 | Schneider et al. | 709/229 |
| 8,978,086 | B2 | * | 3/2015 | Bhatia et al. | 725/133 |
| 2001/0044785 | A1 | * | 11/2001 | Stolfo et al. | 705/74 |
| 2002/0029249 | A1 | * | 3/2002 | Campbell et al. | 709/206 |
| 2002/0087857 | A1 | * | 7/2002 | Tsao et al. | 713/155 |
| 2002/0138333 | A1 | * | 9/2002 | DeCotiis et al. | 705/10 |
| 2002/0169965 | A1 | * | 11/2002 | Hale et al. | 713/182 |
| 2004/0215956 | A1 | * | 10/2004 | Venkatachary et al. | 713/150 |
| 2005/0257261 | A1 | * | 11/2005 | Shraim et al. | 726/22 |
| 2006/0026687 | A1 | * | 2/2006 | Peikari | 726/24 |
| 2006/0248021 | A1 | * | 11/2006 | Jain et al. | 705/75 |
| 2006/0294599 | A1 | * | 12/2006 | Sim et al. | 726/34 |
| 2007/0028301 | A1 | * | 2/2007 | Shull et al. | 726/22 |
| 2007/0107053 | A1 | * | 5/2007 | Shraim et al. | 726/22 |
| 2007/0192853 | A1 | * | 8/2007 | Shraim et al. | 726/22 |
| 2007/0294762 | A1 | * | 12/2007 | Shraim et al. | 726/22 |
| 2007/0299777 | A1 | * | 12/2007 | Shraim et al. | 705/51 |
| 2007/0299915 | A1 | * | 12/2007 | Shraim et al. | 709/206 |
| 2008/0040275 | A1 | * | 2/2008 | Paulsen et al. | 705/44 |
| 2008/0288405 | A1 | * | 11/2008 | John | 705/44 |

(Continued)

FOREIGN PATENT DOCUMENTS

| IN | 672MUM2010 A | 9/2010 |
|---|---|---|
| WO | 0111442 | 2/2001 |

*Primary Examiner* — David Garcia Cervetti  
(74) *Attorney, Agent, or Firm* — Robert Plotkin, P.C.

(57) ABSTRACT

An online fraud prevention system enables a user who sponsors an online activity to select a particular level of fraud prevention from a plurality of levels of fraud prevention. The system associates the particular level of fraud prevention with the online activity. The system identifies, from among a plurality of methods of fraud prevention, a particular fraud prevention method associated with the particular level of fraud prevention. The fraud prevention system applies the particular fraud prevention method to the online activity.

12 Claims, 2 Drawing Sheets

(56) References Cited

U.S. PATENT DOCUMENTS

| | | | |
|---|---|---|---|
| 2009/0055915 A1* | 2/2009 | Piliouras | 726/8 |
| 2009/0064327 A1* | 3/2009 | Stukanov | 726/22 |
| 2009/0106084 A1* | 4/2009 | Or | 705/10 |
| 2009/0177529 A1* | 7/2009 | Hadi | 705/10 |
| 2009/0182872 A1* | 7/2009 | Hong | 709/224 |
| 2010/0094768 A1* | 4/2010 | Miltonberger | 705/325 |
| 2010/0094791 A1* | 4/2010 | Miltonberger | 706/46 |
| 2010/0293090 A1* | 11/2010 | Domenikos et al. | 705/38 |
| 2011/0145057 A1* | 6/2011 | Jones et al. | 705/14.42 |
| 2011/0191200 A1* | 8/2011 | Bayer et al. | 705/26.1 |
| 2011/0270752 A1* | 11/2011 | Neto et al. | 705/44 |
| 2012/0017266 A1* | 1/2012 | DiChiara et al. | 726/4 |
| 2013/0014153 A1* | 1/2013 | Bhatia et al. | 725/24 |
| 2013/0198815 A1* | 8/2013 | Piliouras | 726/4 |
| 2013/0262204 A1* | 10/2013 | Stiles et al. | 705/14.13 |

* cited by examiner

FRAUD PREVENTION IN ONLINE SYSTEMS

CROSS-REFERENCE TO RELATED APPLICATIONS

This application claims priority to U.S. Prov. Pat. App. Ser. No. 61/651,443, filed on May 24, 2012, entitled, "Fraud Prevention in Online Systems," which is hereby incorporated by reference herein.

BACKGROUND

In various online social networking systems, such as Facebook, there are a variety of situations in which users may be asked to vote. For example, quizzes, polls, contests, promotions, and games may be provided on Facebook in which users may place votes. For example, in an online quiz, a user may be asked to vote for an answer that the user believes to be correct in response to a particular question. Certain online activities involving voting, such as online contests, may provide prizes, such as monetary prizes or online coupons, to users who participate in the activity and who satisfy certain criteria. For example, if a user's entry in a photo contest gets the most votes, the user may be given a prize.

Fraud is very widespread in such online activities on online social networking sites, in part because of the availability and value of the prizes that can be obtained in exchange for participating in such activities. This is particularly true when the monetary value of the prizes is very high. As a result, companies that run polls, contests, and other voting-related activities online have a strong interest in ensuring that such activities are fair and protected against fraud.

Various kinds of fraud can occur in connection with online voting. For example, one kind of fraud is identity-related fraud, in which the user who participates in the activity is not who the user purports to be. When a user takes part in an online activity through a social networking system, such as Facebook, the user performs actions via the user's profile (account) in that social networking system. Such profiles contain a variety of information about the user who is associated with the profile, such as the user's name, email address, and mailing address. It can be difficult to determine, however, whether a user who performs actions on the social networking system through a particular profile actually is the person who is represented by the profile. For example, if Person A creates a profile that contains accurate information about Person A, but Person B steals Person A's login credentials (e.g., username and password), then Person B may log in to Person A's profile on the social networking system and then perform actions on the social networking system. Although such actions may appear, within the social networking system, to be performed by Person A, they are in fact performed by Person B. If such actions include voting in an online contest, then such votes are fraudulent because they were not cast by the true Person A.

As another example, in some cases it may be possible for a piece of software to log in to a person's social networking profile and to perform actions through said profile, such as by voting through said profile. This is another example of fraudulent voting.

Yet another example of fraudulent voting performed through an online social networking profile is the case in which a user creates a profile that does not represent any real person. Such a profile may, for example, include a fictitious name, a fictitious email address, and a fictitious mailing address. In some cases it may be necessary to provide a real email address, but still be possible to provide other information that is fictitious. When the user creates such a profile and then performs actions on the social networking system, such as voting, such actions are yet another example of fraudulent voting.

What is needed, therefore, are techniques for protecting against fraudulent voting in online systems.

SUMMARY

An online fraud prevention system enables a user who sponsors an online activity to select a particular level of fraud prevention from a plurality of levels of fraud prevention. The system associates the particular level of fraud prevention with the online activity. The system identifies, from among a plurality of methods of fraud prevention, a particular fraud prevention method associated with the particular level of fraud prevention. The fraud prevention system applies the particular fraud prevention method to the online activity.

For example, one embodiment of the present invention is a method performed by at least one computer processor executing computer program instructions stored in a non-transitory computer-readable medium. The method includes: (A) receiving, from a first user, first input selecting: (1) an online activity and (2) a particular level of fraud prevention from among a plurality of levels of fraud prevention; (B) identifying, from among a plurality of methods of fraud prevention, a particular fraud prevention method associated with the particular level of fraud prevention; and (C) applying the particular fraud prevention method to the online activity.

Other features and advantages of various aspects and embodiments of the present invention will become apparent from the following description and from the claims.

DETAILED DESCRIPTION

Figure 1:
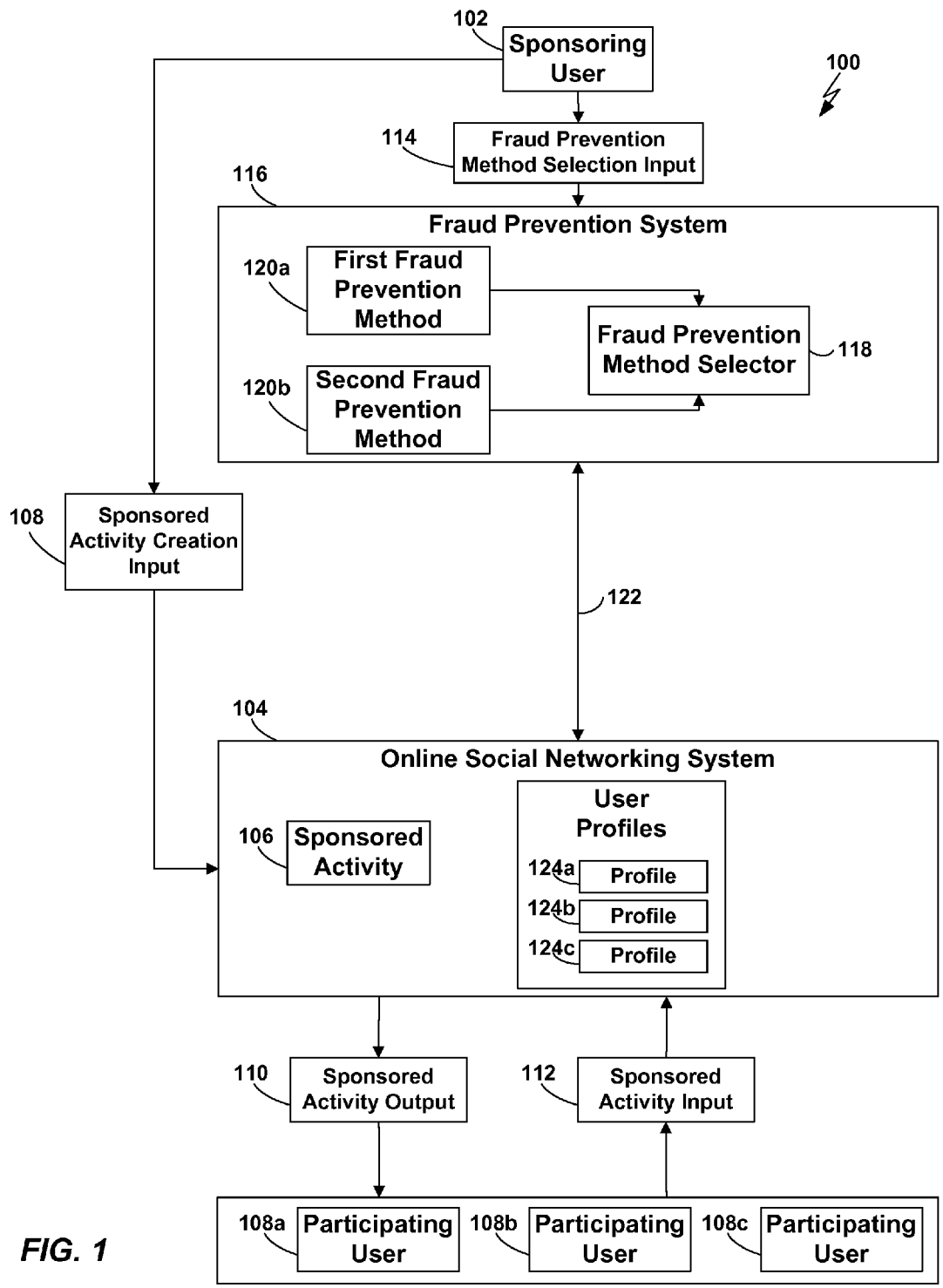
FIG. 1 is a dataflow diagram of a system for enabling a sponsoring user to select a method of fraud prevention to apply to an online activity according to one embodiment of the present invention.
Figure 2:
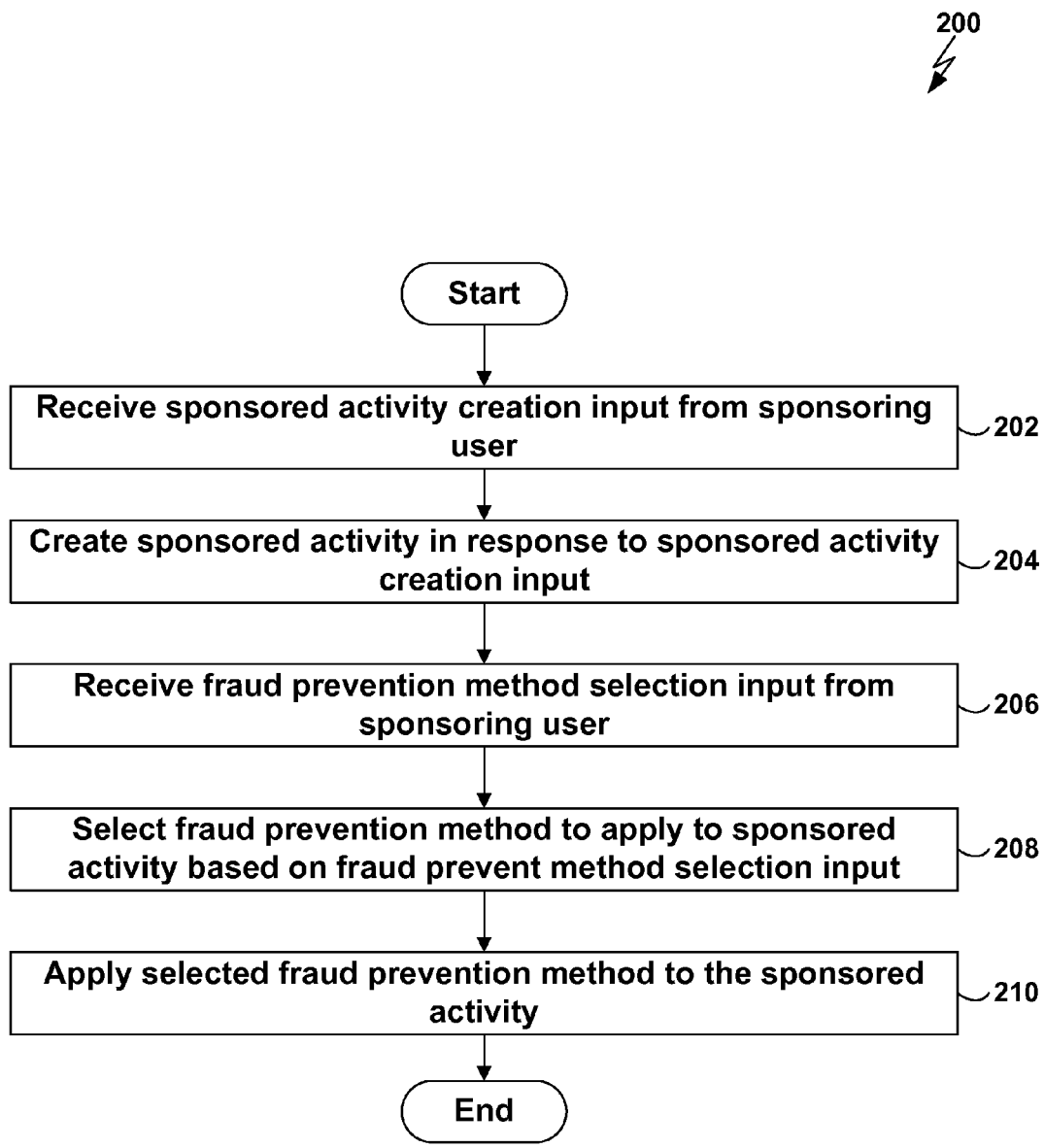
FIG. 2 is a flowchart of a method performed by the system of FIG. 1 according to one embodiment of the present invention.

Embodiments of the present invention protect against fraudulent actions in online systems. Some examples of fraudulent actions that may be protected against by embodiments of the present invention include fraudulent voting, such as fraudulent voting in polls, contests, games, and other activities hosted by online social networking systems, such as Facebook. Referring to FIG. 1, a dataflow diagram is shown of a system 100 for preventing fraud in online activities according to one embodiment of the present invention. Referring to FIG. 2, a flowchart is shown of a method 200 performed by the system 100 according to one embodiment of the present invention.

In particular, a user 102 (such as a person or an organization) of an online social networking system 104 (such as Facebook or Twitter) may create an online activity, such as a poll or contest, represented by online activity data 106. The online activity data 106 may contain any of a variety of data related to the online activity, such as questions posed by the online social networking system 104 to users 108*a-c* of the system 104 as part of the online activity, answers provided by users 108*a-c* to those questions, and known correct answers to those questions. For ease of explanation, the term "online activity" may be used herein to refer interchangeably to actions performed as part of an online activity (such as posing questions to users) and to the data 106 representing the activity. The user 102 may create the online activity 106 by providing any suitable input 108 specifying one or more characteristics of the online activity 106 (FIG. 2, operations 202 and 204). The user 102 is referred to herein as the "sponsoring user" because the user 102 creates or otherwise sponsors the online activity 106 through the online social networking system 104. The activity 106 that is sponsored by the sponsoring user 102 is referred to herein as the "sponsored activity" 106. The sponsored activity 106 may, for example, be maintained by the online social networking system 104 itself or by a plug-in, app, or other software that is installed within or otherwise works in conjunction with the online social networking system 104. Although only one sponsored activity 106 is shown in FIG. 1 for ease of illustration, the online social networking system 104 may include any number of sponsored activities, sponsored by any number of sponsoring users.

Users 108*a-c* of the system 100 other than the sponsoring user 102 may participate in the sponsored activity 106. Such users 108*a-c* are referred to herein as "participating users." Although only three participating users 108*a-c* are shown in FIG. 1 for ease of illustration, the system 100 may include any number of participating users. As will become clear from the description below, a "participating user" may participate in a sponsored activity or merely attempt to participate in the sponsored activity, but be prevented from participating in the sponsored activity if an embodiment of the present invention determines that the participating user is engaged in, or is likely engaged in, fraudulent activity. The online social networking system 104 may, for example, provide output 110 to the participating users 108*a-c* relating to the sponsored activity 106 (such as output representing questions to be voted upon), receive input 112 from the participating users 108*a-c* (such as input representing the participating users' 108*a-c* votes or answers to the questions), and process the participating users' 108*a-c* input 112 (such as by tallying the votes from multiple participating users or determining whether a particular answer is correct).

Embodiments of the present invention may enable the sponsoring user 102 to choose from at least two levels of fraud prevention to associate with and apply to the sponsored activity 106, such as a high level of fraud prevention and a low level of fraud prevention. The sponsoring user 102 may provide input 114 specifying the sponsored activity 106 and the level of fraud prevention selected by the sponsoring user 102 for the sponsored activity 106. The system 100 may include a fraud prevention system 116, which may receive the fraud prevention method selection input 114 from the sponsoring user 102 (FIG. 2, operation 206). In response to receiving such input 114, a fraud prevention method selection module 118 in the fraud prevention system 116 may select, based on the input 114, a fraud prevention method to apply to the sponsored activity 106 (FIG. 2, operation 208). The fraud prevention method selection module 118 may, for example, select one of a plurality of fraud prevention methods 120*a-b*. The fraud prevention system 116 may apply the selected fraud prevention method to the sponsored activity 106 (FIG. 2, operation 210). The fraud prevention system 116 may apply the selected fraud prevention method to the sponsored activity 106 by receiving/providing any of a variety of input/output from/to the online social networking system 104 as necessary to implement the selected fraud prevention method.

In the particular example illustrated in FIG. 1, assume that the first fraud prevention method 120*a* is a method that implements a high level of fraud prevention and that the second fraud prevention method 120*b* is a method that implements a low level of fraud prevention. Each such level of fraud prevention may take any of a variety of forms. For example, in one embodiment, the high level of fraud prevention may be applied to the sponsored activity 106 as follows. If one of the participating users 108*a-c*, such as participating user 108*a*, attempts to participate in the sponsored activity 106 when the sponsored activity 106 is associated with the high level of fraud prevention (e.g., when the first method 120*a* is being applied to the sponsored activity 106), then the fraud prevention system 116 may require the participating user 108*a* to affirmatively grant permission to the fraud prevention system 116 to access the participating user's online social networking profile 124*a* (e.g., the user's Facebook profile). The fraud prevention system 116 may, for example, prompt the participating user 108*a* to grant or deny the fraud prevention system 116 access to the participating user's online social networking profile 124*a*, such as by displaying a dialog box with the message, "Do you grant permission to access your Facebook profile?," accompanied by buttons labeled "Yes" and "No." The participating user 108*a* may be required to provide input in response to the prompt and be prohibited from participating in the sponsored activity 106 unless and until the participating user 108*a* provides such input.

If the participating user 108*a* provides input that denies the fraud prevention system 116 access to the participating user 108*a*'s online social networking profile 124*a* (such as by clicking on the "No" button in the example above), or the participating user 108*a* fails to provide input that grants the fraud prevention system 116 access to the user 108*a*'s online social networking profile 124*a*, then the fraud prevention system 116 may prohibit the participating user 108*a* from participating in the sponsored activity 106.

If the participating user 108*a* provides input that grants the fraud prevention system 116 access to the participating user 108*a*'s online social networking profile 124*a* (such as by clicking on the "Yes" button in the example above), then the fraud prevention system 116 may access the participating user 108*a*'s online social networking system profile 124*a* and analyze data contained within that profile 124*a* to determine whether the profile 124*a* contains fraudulent data.

For example, the fraud prevention system 116 may analyze data contained within the profile 124*a* to determine whether the profile 124*a* represents a real human user or whether the profile 124*a* instead does not represent a real human user. For example, the fraud prevention system 116 may analyze data contained within the profile 124*a* to determine whether the profile 124*a* contains computer-generated data rather than data input by and representing a real human user. If the fraud prevention system 116 determines that the profile 124*a* does not contain fraudulent data (e.g., that the profile 124*a* represents a real human user), then the fraud prevention system 116 allows the participating user 108*a* to participate in the online activity 106 via the profile 124*a*. If the fraud prevention system 116 determines that the profile 124*a* does contain fraudulent data (e.g., that the profile 124*a* contains computer-generated data), then the fraud prevention system 116 prohibits the participating user 108*a* from participating in the online activity 106 via the profile 124*a*. Alternatively, for example, the fraud prevention system 116 may not automatically prohibit the participating user 108*a* from participating in the online activity 106; instead the fraud prevention system 116 may calculate (e.g., based on the participating user 108*a*'s profile 124*a*) a fraud score which indicates a likelihood that the participating user 108a is and/or will engage in fraudulent activity in connection with the online activity 106. The fraud prevention system 116 may provide output representing such a fraud score to the sponsoring user 102. The sponsoring user 102 may evaluate the fraud score and, if the sponsoring user 102 determines that the participating user 108a is or is likely to engage in fraudulent activity in connection with the online activity 106, the sponsoring user 102 may provide input to the fraud prevention system 116 representing an instruction to prohibit the participating user 108a from participating in the online activity 106. In response to receiving such input, the fraud prevention system 116 may prohibit the participating user 108a from participating in the online activity 106. The fraud prevention system 116 may permit the participating user 108a to participate in the online activity 106 unless and until the sponsoring user 102 provides input representing an instruction to prohibit the participating user 108a from participating in the online activity 106.

In summary, if the high level of fraud detection is associated with the sponsored activity 106 (e.g., if the first method 120a is applied to the sponsored activity 106), then the fraud prevention system 116 only permits a participating user (as represented by a particular profile) to participate in the sponsored activity 106 if: (1) the participating user grants the fraud prevention system 116 with access to the participating user's profile; and (2) an analysis of the profile determines that the profile does not (or is not likely to) contain fraudulent data.

In one embodiment, the low level of fraud prevention may be applied to the sponsored activity 106 as follows. If one of the participating users 108a-c, such as participating user 108a, attempts to participate in the sponsored activity 106 when the sponsored activity 106 is associated with the low level of fraud prevention (e.g., when the second method 120b is being applied to the sponsored activity 106), then the fraud prevention system 116 may not require the participating user 108a to affirmatively grant permission to the fraud prevention system 116 to access the participating user 108a's online social networking profile 124a (e.g., the user's Facebook profile). For example, when the sponsored activity 106 is associated with the low level of fraud prevention, the fraud prevention system 116 may not prompt the participating user 108a to grant or deny the fraud prevention system 116 access to the participating user 108a's online social networking profile 124a. Furthermore, when the sponsored activity 106 is associated with the low level of fraud prevention, the fraud prevention system 116 may not make any attempt to determine whether the participating user 108a's profile 124a contains fraudulent data.

Therefore, if the sponsored activity 106 is associated with the low level of fraud prevention (e.g., if the second method 120b is being applied to the sponsored activity 106), then the fraud prevention system 116 may allow any participating user (as represented by any profile) to participate in the sponsored activity 106. Alternatively, for example, if the sponsored activity 106 is associated with the low level of fraud prevention (e.g., if the second method 120b is being applied to the sponsored activity 106), then the fraud prevention system 116 may prompt the participating user 108a with one or more questions (such as answers designed to distinguish between humans and computers) and require the participating user 108a to provide input representing answers to those one or more questions. The fraud prevention system 116 may determine whether to allow the participating user 108a to participate in the sponsored activity 106 based on the answers provided by the participating user 108a. For example, the fraud prevention system 116 may compare the answers provided by the participating user 108a to answers known by the fraud prevention system 116 to be correct, and allow the participating user 108a to participate in the sponsored activity 106 only if all of the provided answers match the corresponding answers known to be correct. In this example, the fraud prevention system 116's decision to allow or prohibit the participating user 108a from participating in the sponsored activity 106 is based on input provided by the participating user 108a to the fraud prevention system 116, rather than information contained in the user 108a's online social networking profile 124a. This embodiment, therefore, enables the fraud prevention system 116 to determine whether to allow the participating user 108a to participate in the sponsored activity 106 even if the fraud prevention system 116 does not have access to the participating user 108a's online social networking profile 124a.

The particular examples described above are merely examples of a more general approach in which the fraud prevention system 116 enables a user 102 who sponsors a particular activity 106 to select a particular level of fraud prevention from a plurality of levels of fraud prevention (such as "high" and "low" levels of fraud prevention). The fraud prevention system 116 associates the particular level of fraud prevention with the online activity 106. The fraud prevention system 116 identifies, from among a plurality of methods 120a-b of fraud prevention, a particular fraud prevention method associated with the particular level of fraud prevention. The plurality of methods 120a-b may, for example, include the methods described above in connection with the example "high" and "low" levels of fraud prevention. The fraud prevention system 116 applies the particular fraud prevention method to the online activity 106.

Although in the example above there are two levels of fraud prevention, labeled "high" and "low," this is merely an example and does not constitute a limitation of the present invention. More generally, embodiments of the present invention may implement any number of levels of fraud prevention, such as three, four, or five levels.

Furthermore, features of the fraud prevention levels disclosed herein may be combined with each other. For example, the fraud prevention system 116 may use both information contained in the participating user 108a's online social networking profile 124a and answers provided by the participating user 108a to the fraud prevention system 116's questions to determine whether to allow the participating user 108a to participate in the sponsored activity 106.

Furthermore, any of the techniques described herein in connection with the participating user 108a and the participating user 108a's online social networking profile 124a may equally be applied to other participating user 108b-c and their online social networking profiles 124b-c, respectively.

Embodiments of the present invention may take other steps, in addition to or instead of those disclosed above, to perform fraud prevention. For example, embodiments of the present invention may implement any of a variety of policies for limiting multiple votes from a single participating user, such as one or more of the following policies: (1) the participating user may vote for only one entry in a particular activity, and cast only a single vote for that entry; (2) the participating user may vote for multiple entries in a particular activity, but cast only a single vote per entry; (3) the participating user may vote for multiple entries in a particular activity, but be limited to one vote per day (or other time period, e.g., hour); (4) the participating user may vote for multiple entries in a particular activity, but be limited to one vote per day (or other time period, e.g., hour) per entry; (5) the participating user may vote for multiple entries in a contest, with no limits on the number of votes the user may cast for any entry in any time period.

Embodiments of the present invention have a variety of advantages, such as the following. Embodiments of the present invention enable a user who sponsors an online activity, such as an online quiz, poll, or contest, to pick a level of fraud prevention to apply to the online activity from among a plurality of levels of fraud prevention. This provides the sponsoring user with flexibility in applying fraud prevention to the sponsored activity, depending on the degree of need for fraud prevention in connection with that particular sponsored activity. For example, certain activities, such as activities that offer high-value prizes, may warrant the application of a high level of fraud prevention, while other activities, such as activities that offer low-value prizes, may warrant the application of only a low level of fraud prevention. Embodiments of the present invention enable the sponsoring user to select and apply to the sponsored activity a level of fraud prevention that is appropriate for that specific sponsored activity.

Furthermore, embodiments of the present invention do not limit the sponsoring user to using only a single level of fraud prevention. For example, the sponsoring user may sponsor two activities and apply one level of fraud prevention (e.g., a high level of fraud prevention) to one activity and apply another level of fraud prevention (e.g., a low level of fraud prevention) to another activity. As another example, the sponsoring user may sponsor an activity and apply one level of fraud prevention to the activity initially, but at a later time change the level of fraud prevention that is applied to the activity to a different level of fraud prevention. These are merely examples of ways in which embodiments of the present invention provide users with flexibility in applying fraud prevention to activities that they sponsor online.

A further benefit of embodiments of the present invention is that they enable users to apply selected levels of fraud prevention to online activities easily, without the need to specify the details of such levels of fraud prevention. For example, embodiments of the present invention may enable a user to sponsor an online activity and simply select the level of fraud prevention to apply to that activity. In response, the fraud prevention system may apply the selected level of fraud prevention to the activity automatically, including taking all actions necessary to enforce the selected level of fraud prevention, such as by accessing and analyzing data in participating users' online social networking profiles and allowing or prohibiting such users from participating in the activity based on the result of such analysis. The sponsoring user need not write any program code or take any other complex steps to implement the fraud prevention techniques disclosed herein. Yet another benefit of embodiments of the present invention is that contests on online social networking systems often are available to the public, so that fraudulent activity within such contests can hurt the reputation of the sponsoring user and result in negative comments about the fraudulent activity being posted to the online social networking system by other users. Identifying and preventing fraudulent activity quickly can help to protect the reputation of the sponsoring user and mitigate the risk of legal liability resulting from claims by legitimate users that they were cheated out of a prize by the fraudulent activity.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The description herein refers to certain online social networking systems, such as Facebook and Twitter, merely for purposes of example. Embodiments of the present invention are not limited to use in conjunction with these particular online social networking systems, but instead may be used in conjunction with any one or more online social networking systems. More generally, embodiments of the present invention may be used in conjunction with any online system for hosting content, such as any web site. Therefore, any reference herein to an "online social networking system" should be understood to refer more generally to any online system for hosting content, whether or not such a system includes social networking features.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Any input/output (I/O) described herein, such as elements 108, 110, 112, and 114 in FIG. 1, may be communicated within a computing device or between two or more computing devices, such as over any suitable network (such as the public Internet or a private intranet) or networks. Any input disclosed herein as being provided by a user may be provided by such user using any suitable input device, such as a keyboard, mouse, touchscreen, trackpad, microphone, or any combination thereof. Any output disclosed herein may be output using any suitable output device, such as a monitor, touchscreen, speakers, or any combination thereof.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method, performed by at least one computer processor executing computer program instructions stored in a non-transitory computer-readable medium, the method comprising:
    (A) at a fraud prevention system, receiving, from a first user, first input selecting: (1) an online activity and (2) a particular level of fraud prevention, from among a plurality of levels of fraud prevention;
    (B) at the fraud prevention system, identifying, from among a plurality of methods of fraud prevention, a particular fraud prevention method associated with the particular level of fraud prevention; and
    (C) at the fraud prevention system, applying the particular fraud prevention method to the online activity, comprising:
        (C)(1) prompting a second user to grant permission to the fraud prevention system to access an online social networking profile of the second user; and
        (C)(2) prohibiting the second user from participating in the online activity if the second user does not grant permission to access the online social networking profile of the second user.

2. The method of claim 1, wherein (C) further comprises, before (C)(2):
    (C)(3) receiving second input from the second user;
    (C)(4) determining whether the second input grants permission to access the online social networking profile of the second user; and
    wherein (C)(2) comprises prohibiting the second user from participating in the online activity if the second input is not determined to grant permission to access the online social networking profile of the second user.

3. The method of claim 1, wherein (C)(2) comprises:
    (C)(2)(a) determining that the second user has failed to provide input granting permission to access the online social networking profile of the second user; and
    (C)(2)(b) prohibiting the second user from participating in the online activity in response to determining that the second user has failed to provide input granting permission to access the online social networking profile of the second user.

4. The method of claim 1, wherein (C) comprises:
    (C)(1) receiving second input from a second user, wherein the second input grants permission to access an online social networking profile of the second user;
    (C)(2) in response to receiving the second input, determining whether the online social networking profile of the second user contains fraudulent data;
    (C)(3) allowing the second user to participate in the online activity if the online social networking profile of the second user is not determined to contain fraudulent data; and
    (C)(4) prohibiting the second user from participating in the online activity if the online social networking profile of the second user is determined to contain fraudulent data.

5. The method of claim 1, wherein (C) comprises:
    (C)(1) prompting a second user with a question;
    (C)(2) receiving input from the second user representing an answer to the question; and
    (C)(3) determining whether to permit the second user to participate in the online activity based on the answer to the question.

6. The method of claim 5, wherein (C)(3) comprises determining whether to permit the second user to participate in the online activity based on the answer to the question, without accessing an online social networking profile of the second user.

7. A system comprising at least one non-transitory computer-readable medium having computer program instructions stored thereon, wherein the computer program instructions are executable by at least one computer processor to perform a method, the method comprising:
    (A) at a fraud prevention system, receiving, from a first user, first input selecting: (1) an online activity and (2) a particular level of fraud prevention from among a plurality of levels of fraud prevention;
    (B) at the fraud prevention system, identifying, from among a plurality of methods of fraud prevention, a particular fraud prevention method associated with the particular level of fraud prevention; and
    (C) at the fraud prevention system, applying the particular fraud prevention method to the online activity, comprising:
        (C)(1) prompting a second user to grant permission to the fraud prevention system to access an online social networking profile of the second user; and
        (C)(2) prohibiting the second user from participating in the online activity if the second user does not grant permission to access the online social networking profile of the second user.

8. The system of claim 7, wherein (C) further comprises, before (C)(2):
    (C)(3) receiving second input from the second user;
    (C)(4) determining whether the second input grants permission to access the online social networking profile of the second user; and
    wherein (C)(2) comprises prohibiting the second user from participating in the online activity if the second input is not determined to grant permission to access the online social networking profile of the second user.

9. The system of claim 7, wherein (C)(2) comprises:
    (C)(2)(a) determining that the second user has failed to provide input granting permission to access the online social networking profile of the second user; and
    (C)(2)(b) prohibiting the second user from participating in the online activity in response to determining that the second user has failed to provide input granting permission to access the online social networking profile of the second user.

10. The system of claim 7, wherein (C) comprises:

(C)(1) receiving second input from a second user, wherein the second input grants permission to access an online social networking profile of the second user;

(C)(2) in response to receiving the second input, determining whether the online social networking profile of the second user contains fraudulent data;

(C)(3) allowing the second user to participate in the online activity if the online social networking profile of the second user is not determined to contain fraudulent data; and (C)(4) prohibiting the second user from participating in the online activity if the online social networking profile of the second user is determined to contain fraudulent data.

11. The system of claim 7, wherein (C) comprises:

(C)(1) prompting a second user with a question;

(C)(2) receiving input from the second user representing an answer to the question; and (C)(3) determining whether to permit the second user to participate in the online activity based on the answer to the question.

12. The system of claim 11, wherein (C)(3) comprises determining whether to permit the second user to participate in the online activity based on the answer to the question, without accessing an online social networking profile of the second user.

* * * * *